United States Patent Office 3,395,152
Patented July 30, 1968

3,395,152
PREPARATION OF d,l-PSEUDOYOHIMBANES
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Mar. 14, 1966, Ser. No. 533,810
3 Claims. (Cl. 260—288)

ABSTRACT OF THE DISCLOSURE

A class of d,l-pseudoyohimbanes is disclosed. These compounds are prepared by condensing dimethyl-trans-2-carboxycyclohexaneacetate with tryptamine to produce an intermediate imide followed by reduction of the imide to produce a dechydroisoquinoline nucleus, and finally the isoquinoline nucleus is cyclized. These compounds are useful as anti-inflammatory agents.

This invention relates to new and useful heterocyclic compounds and relates more particularly to new and novel d,l-pseudoyohimbanes having the formula

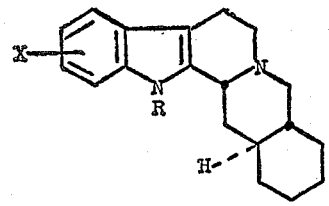

wherein X represents hydrogen, lower alkyl such as methyl, ethyl, propyl, isobutyl, hexyl and the like, lower alkoxy such as methoxy and ethoxy, halogen such as fluorine, chlorine and bromine, amino, N,N-disubstitude amino such as N,N-dilower alkyl, amino in which lower alkyl has the same meaning as defined, etherified mercapto such as methylmercapto and ethylmercapto, nitro and hydroxyl and R represents hydrogen, lower alkyl such as methyl, ethyl, propyl, isobutyl, hexyl and the like, aralkyl such as phenyl lower alkyl in which lower alkyl has the same meaning as defined, substituted aralkyl such as halogen substituted phenyl lower alkyl, nitro substituted phenyl lower alkyl, acyl of a carboxylic acid such as acetyl, benzoyl and the like.

The numbering of the compounds of this invention is as follows:

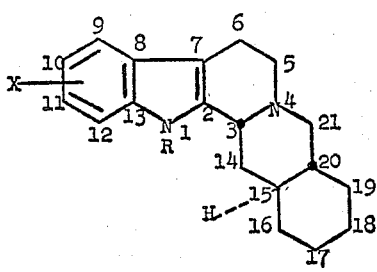

The use of a dot at ring junctions as in structure 4 below denotes beta orientation of the hydrogen atom whereas the use of a dotted line denotes alpha orientation of the hydrogen atom. The use of a wiggle line in this structure denotes that the hydrogen atom can be either alpha or beta orientated. Since all the compounds described in this patent are d,l-mixtures, the above stereochemical designations are only relative and each structure is to be considered as only one of the two mirror images.

Also embraced within the scope of this invention are the pharmaceutically accepted acid addition salts of the above-described bases, their quaternary ammonium salts and N-oxides.

The symbols R and X as used hereinafter have the same meaning as described above.

The invention also includes within its scope a new and novel process for preparing the above compounds as well as the intermediates useful for their synthesis.

The new and novel compounds of this invention have interesting and significant pharmacological activity and are useful as anti-inflammatory agents.

In order to use these compounds or their salts or their N-oxides, the selected active ingredient from about 1 to 100 mg. is combined with a pharmaceutical carrier to form dosage forms such as tablets and capsules suitable for oral administration or solutions and suspensions suitable for parenteral administration. The dosage regimen may be adjusted according to individual needs.

In addition these compounds are valuable intermediates in the production of other compounds of the d,l-pseudoyohimbane series.

The compounds of this invention are prepared by condensing dimethyl trans-2-carboxycyclohexaneacetate of the formula:

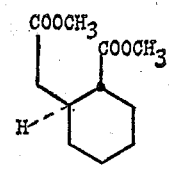

with a tryptamine of the formula:

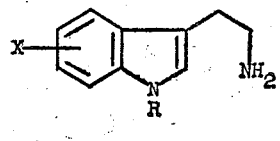

to produce an imide of the formula:

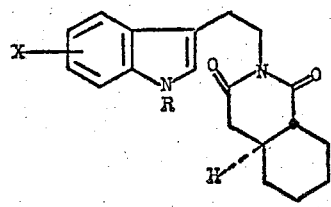

The reaction is carried out by heating the diester and tryptamine at a temperature such as at 100–200° C. and more particularly near 175° C.

Reduction of the imide 3 with a metal hydride such as lithium aluminum hydride results in a decahydroisoquinoline of the formula:

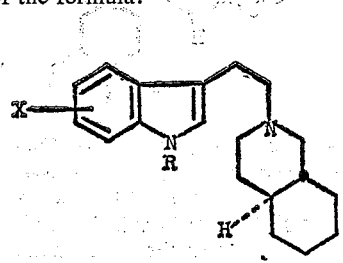

Oxidative cyclization of 4 results in a d,l-pseudoyohimbane of the formula:

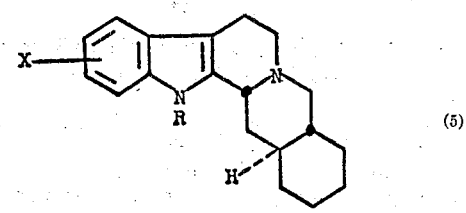

This reaction is usually carried out in an acid media such as dilute acetic acid with an oxidizing agent such as mercuric acetate.

The compounds of this invention wherein R is H may be alkylated with a suitable alkylating agent such as dimethyl carbonate in the presence of sodium hydride.

The compounds of this invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The N-oxides are obtained by treating the free base with an oxidizing agent such as hydrogen peroxide.

The following examples are included in order further to illustrate the invention.

Example 1.—Hexahydro-2-(2-indol-3-ylethyl)-trans-1,3-(2H,4H)-isoquinolinedione

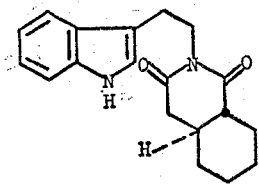

A mixture of 62 g. of tryptamine and 91 g. of dimethyl trans-2-carboxycyclohexaneacetate was heated at 175° C. for 20 hrs. The reaction mixture was digested with 700 ml. of methanol on the steam bath for 20 min. After cooling to room temperature, filtration gave 83 g. (70%) of a crystalline solid, M.P. 251–252° C. Recrystallization from methanol gave an analytical sample, M.P. 252–253° C.

Analysis for $C_{19}H_{22}N_2O_2$: Calcd.: C, 73.52; H, 7.15; N, 9.03. Found: C, 73.35; H, 7.31; N, 9.07.

Example 2.—Decahydro-2-[2-indol-3-ylethyl]-trans-isoquinoline

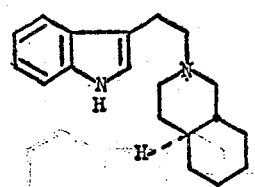

To a solution of 12 g. of lithium aluminum hydride in 500 ml. of tetrahydrofuran was added over a 1 hr. interval a hot solution of 10.5 g. of hexahydro-2-(2-indol-3-ylethyl)-trans-1,3-(2H,4H)-isoquinolinedione in 900 ml. of tetrahydrofuran. After the addition had been completed, refluxing was continued for an additional 6 hrs. The reaction mixture was decomposed by the addition of water. The tetrahydrofuran solution was decanted from the precipitate and the solvent was removed. Recrystallization of the residue from acetonitrile gave 7.6 g. (80%) of a crystalline solid, M.P. 151–152° C.

Analysis for $C_{19}H_{26}N_2$: Calcd.: C, 80.80; H, 9.28; N, 9.92. Found: C, 80.64; H, 9.39; N, 9.70.

Example 3.—d,l-psuedo-yohimbane

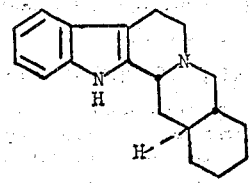

A solution of 14.1 g. of decahydro-2-(2-indol-3-yl)-trans-isoquinoline and 190 g. of mercuric acetate in 1250 ml. of 5% acetic acid was heated at 70–75° C. for 12 hrs. The reaction mixture was saturated with hydrogen sulfide and filtered while hot. The precipitate was washed with an additional 1500 ml. of 5% acetic acid. The filtrates were combined, concentrated to 200 ml. in vacuo and 500 ml. of methanol added. The pH of the solution was adjusted to 5 with 10% sodium hydroxide solution and 25 g. of sodium borohydride added at 10–20° C. After standing at 25° C. for 20 hrs. the methanol was removed in vacuo and the solution extracted with three 100 ml. portions of chloroform. The chloroform layers were combined, washed with water, dried over sodium sulfate, and the solvent was removed. The residue (12.9 g.) after recrystallization from acetonitrile gave 4.4 g. (31%) of a crystalline solid, M.P. 217–220° C. Recrystallization from ethanol gave an analytical sample, M.P. 220–221° C.

Analysis for $C_{19}H_{24}N_2$: Calcd.: C, 81.38; H, 8.63; N, 9.99. Found: C, 81.08; H, 8.67; N, 9.75.

Example 4.—d,l-1-methylpseudoyohimbane

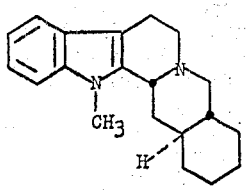

A mixture of 7.8 g. of d,l-pseudoyohimbane, 12 g. of sodium hydride dispersion (50% in mineral oil), 30 ml. of dimethyl carbonate and 600 ml. of tetrahydrofuran was refluxed for 20 hrs. The excess hydride was destroyed by the dropwise addition of water and the solvent was removed in vacuo. The residue was dissolved in 1.2 l. of ether and made acidic with hydrogen bromide. After removal of the salt by filtration, it was treated with a mixture of 10% sodium hydroxide solution and methylene chloride. The methylene chloride layer was washed with water and was dried over sodium sulfate. Recrystallization from acetonitrile gave 4.2 g. (50%) of a solid, M.P. 135–136° C. Further recrystallization gave an analytical sample, M.P. 135.5–136.5° C.

Analysis for $C_{20}H_{26}N_2$: Calcd.: C, 81.58; H, 8.90; N, 9.52. Found: C, 81.34; H, 9.11; N, 9.54.

It is understood that the foregoing detailed description is given merely by way of illustration and that many variations may be made therein without departing from the spirit of our invention.

Having described our invention, what we desire to secure by Letters Patent is:

1. Process for the production of a compound of the formula

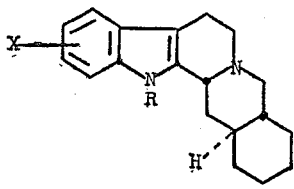

(1)

wherein X is hydrogen and R is a member selected from the group consisting of hydrogen, and lower alkyl, which comprises contacting a compound of the formula

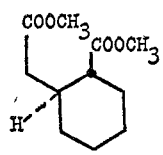

(2)

with a compound of the formula

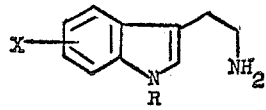

at a temperature of 100–200° C. to produce an imide of the formula

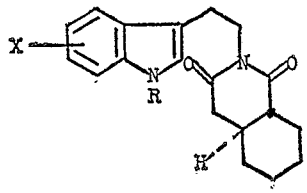

(3)

contacting said imide with a metal hydride to produce a decahydroisoquinoline of the formula (4)

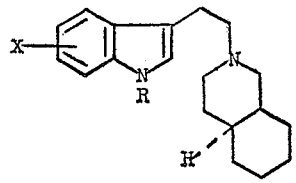

and contacting said decahydroisoquinoline with an oxidizing agent.

2. Process according to claim 1 wherein said metal hydride is lithium aluminum hydride.

3. Process according to claim 1 wherein said oxidizing agent is mercuric acetate.

References Cited

UNITED STATES PATENTS 3,120,534   2/1964   Shavel et al. _____ 260—288

FOREIGN PATENTS 824,496   12/1959   Great Britain.

OTHER REFERENCES

Witkop, Jour. Amer. Chem. Soc., vol. 75 (1953), p. 3362.

Van Tamelen et al., Jour. Amer. Chem. Soc., vol. 78 (1956), pp. 4628, 4631, 4632.

Manske, The Alkaloids, vol. VII (1960), Academic Press, New York, p. 62.

JAMES A. PATTEN, *Primary Examiner.*